United States Patent
Dybsetter et al.

(10) Patent No.: US 7,533,254 B2
(45) Date of Patent: May 12, 2009

(54) VOLATILE MEMORY PERSISTENCE DURING WARM REBOOT IN AN OPTICAL TRANSCEIVER

(75) Inventors: Gerald L Dybsetter, Scotts Valley, CA (US); Jayne C Hahin, Cupertino, CA (US)

(73) Assignee: Finisar Corporation, Sunnyvale, CA (US)

( * ) Notice: Subject to any disclaimer, the term of this patent is extended or adjusted under 35 U.S.C. 154(b) by 433 days.

(21) Appl. No.: 11/228,544

(22) Filed: Sep. 16, 2005

(65) Prior Publication Data

US 2006/0093364 A1 May 4, 2006

Related U.S. Application Data

(60) Provisional application No. 60/623,361, filed on Oct. 29, 2004.

(51) Int. Cl.
*G06F 15/177* (2006.01)
(52) U.S. Cl. ............... 713/2; 713/1; 714/2; 714/25; 714/45; 714/48; 714/49; 714/100; 359/245; 359/333; 398/1; 398/17; 398/22; 398/23; 398/24; 398/135; 398/138
(58) Field of Classification Search ............... 713/1, 713/2; 714/2, 25, 45, 48, 49, 100; 359/245; 359/333; 398/1, 17, 22, 23, 24, 135, 138
See application file for complete search history.

(56) References Cited

U.S. PATENT DOCUMENTS

| | | | | |
|---|---|---|---|---|
| 6,854,054 | B1 * | 2/2005 | Kavanagh | 713/2 |
| 6,965,989 | B1 * | 11/2005 | Strange et al. | 713/1 |
| 7,130,997 | B2 * | 10/2006 | Hsu et al. | 713/2 |
| 2003/0149867 | A1 * | 8/2003 | Park et al. | 713/1 |
| 2006/0031717 | A1 * | 2/2006 | Blanchard et al. | 714/37 |
| 2006/0262441 | A1 * | 11/2006 | Kuhar et al. | 360/1 |

* cited by examiner

*Primary Examiner*—Thomas Lee
*Assistant Examiner*—Jaweed A Abbaszadeh
(74) *Attorney, Agent, or Firm*—Workman Nydegger

(57) ABSTRACT

An operational optical transceiver configured to preserve a portion of volatile memory during a warm reboot process. The optical transceiver includes a persistent memory, a processor, and a system memory. The system memory includes a preserved memory space. The optical transceiver loads microcode from the persistent memory to the system memory without writing into the preserved memory space. The processor processes the microcode and writes certain information into the preserved memory space that will be preserved during a warm reboot. The optical transceiver may then initiate a warm reboot and load microcode from the persistent memory to the system memory that overwrites the existing microcode. However, the information written in the preserved memory space is not overwritten by the microcode loaded from the persistent memory. In this way, a portion of the information contained in the system memory prior to the warm reboot is preserved.

20 Claims, 2 Drawing Sheets

VOLATILE MEMORY PERSISTENCE DURING WARM REBOOT IN AN OPTICAL TRANSCEIVER

CROSS-REFERENCE TO RELATED APPLICATIONS

This application claims the benefit of U.S. Provisional Application No. 60/623,361, filed Oct. 29, 2004, which is incorporated herein by reference in its entirety.

BACKGROUND OF THE INVENTION

1. The Field of the Invention

The present invention relates generally to optical transceivers. More specifically, the present invention relates to preserving a portion of volatile memory in an optical transceiver during a warm reboot. 2. The Relevant Technology Computing and networking technology have transformed our world. As the amount of information communicated over networks has increased, high speed transmission has become ever more critical. Many high speed data transmission networks rely on optical transceivers and similar devices for facilitating transmission and reception of digital data embodied in the form of optical signals over optical fibers. Optical networks are thus found in a wide variety of high speed applications ranging from as modest as a small Local Area Network (LAN) to as grandiose as the backbone of the Internet.

Typically, data transmission in such networks is implemented by way of an optical transmitter (also referred to as an electro-optic transducer), such as a laser or Light Emitting Diode (LED). The electro-optic transducer emits light when current is passed there through, the intensity of the emitted light being a function of the current magnitude. Data reception is generally implemented by way of an optical receiver (also referred to as an optoelectronic transducer), an example of which is a photodiode. The optoelectronic transducer receives light and generates a current, the magnitude of the generated current being a function of the intensity of the received light.

Various other components are also employed by the optical transceiver to aid in the control of the optical transmit and receive components, as well as the processing of various data and other signals. For example, such optical transceivers typically include a driver (e.g., referred to as a "laser driver" when used to drive a laser signal) configured to control the operation of the optical transmitter in response to various control inputs. The optical transceiver also generally includes an amplifier (e.g., often referred to as a "post-amplifier") configured to perform various operations with respect to certain parameters of a data signal received by the optical receiver. A controller circuit (hereinafter referred to the "controller") controls the operation of the laser driver and post amplifier. The controller is initialized for operation at the time the optical transceiver undergoes a boot process.

Therefore, what would be advantageous is to improve the efficiency of such a controller when operating to control the various features of the optical transceiver.

BRIEF SUMMARY OF THE INVENTION

The principles of the present invention relate to preserving a portion of volatile memory in an optical transceiver during a warm reboot process. The optical transceiver includes a persistent memory, a processor, and a system memory. The system memory includes a preserved memory space.

The optical transceiver loads microcode from the persistent memory to the system memory without writing into the preserved memory space during a warm reboot process. The processor processes the microcode and writes certain information into the preserved memory space that is desirable to be preserved during a warm reboot. The information written to the preserved memory space may include data defining an optical transceiver operational error or a run time counter that records when an error may have occurred.

The optical transceiver may then initiate a warm reboot in response to an operational error and load microcode from the persistent memory to the system memory that overwrites the existing microcode. However, the information written in the preserved memory space is not overwritten by the microcode loaded from the persistent memory. Accordingly, a portion of the information contained in the system memory prior to the warm reboot is preserved. This enables later analysis of the vital data in the preserved memory space. A user is able to more easily ascertain the operational error and to determine when the error occurred. This leads to faster and more efficient diagnostics of the optical transceiver.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described explained with additional specificity and detail through the use of the accompanying drawings in which.

DETAILED DESCRIPTION OF THE PREFERRED EMBODIMENTS

The principles of the present invention relate to an operational optical transceiver configured to preserve a portion of volatile memory during a warm reboot process. The optical transceiver includes a persistent memory, a processor and a system memory. The system memory includes a preserved memory space. The optical transceiver loads microcode from the persistent memory to the system memory without writing into the preserved memory space. The processor processes the microcode and writes certain information into the preserved memory space that will be preserved during a warm reboot. The optical transceiver may then initiate a warm reboot and load microcode from the persistent memory to the system memory that overwrites the existing microcode. However, the information written in the preserved memory space is not overwritten by the microcode loaded from the persistent memory. In this way, a portion of the information contained in the system memory prior to the warm reboot is preserved. An example operational optical transceiver environment will first be described. Then, the operation in accordance with the invention will be described with respect to the operational environment.

Figure 1:
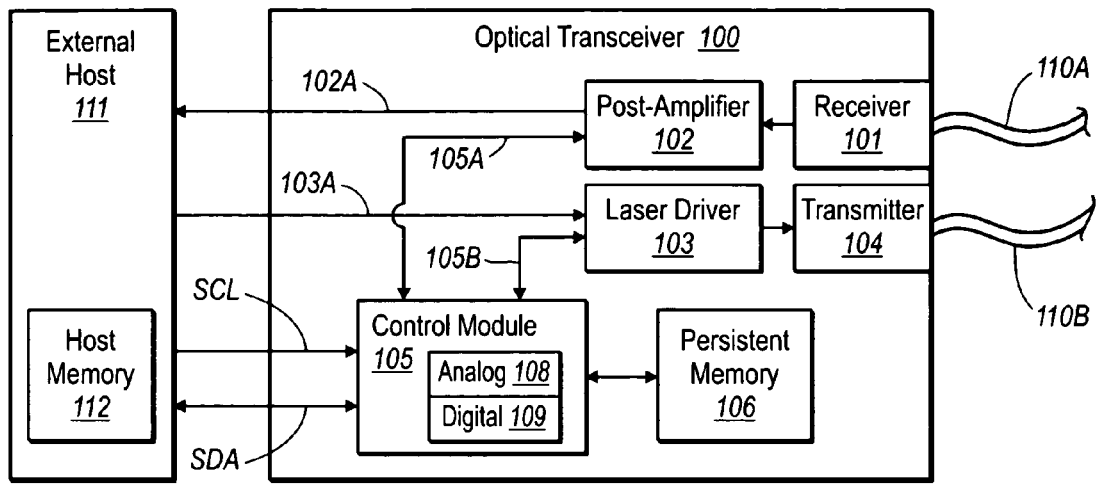
FIG. 1 schematically illustrates an example of an optical transceiver that may implement features of the present invention.

FIG. 1 illustrates an optical transceiver 100 in which the principles of the present invention may be employed. While the optical transceiver 100 will be described in some detail, the optical transceiver 100 is described by way of illustration only, and not by way of restricting the scope of the invention. The principles of the present invention are suitable for 1G, 2G, 4G, 8G, 10G and higher bandwidth fiber optic links. Furthermore, the principles of the present invention may be implemented in optical (e.g., laser) transmitter/receivers of any form factor such as XFP, SFP and SFF, without restriction. Having said this, the principles of the present invention are not limited to an optical transceiver environment at all.

The optical transceiver 100 receives an optical signal from fiber 110A using receiver 101. The receiver 101 acts as an opto-electric transducer by transforming the optical signal into an electrical signal. The receiver 101 provides the resulting electrical signal to a post-amplifier 102. The post-amplifier 102 amplifies the signal and provides the amplified signal to an external host 111 as represented by arrow 102A. The external host 111 may be any computing system capable of communicating with the optical transceiver 100. The external host 111 may contain a host memory 112 that may be a volatile or non-volatile memory source. In one embodiment, the optical transceiver 100 may be a printed circuit board or other components/chips within the host 111, although this is not required.

The optical transceiver 100 may also receive electrical signals from the host 111 for transmission onto the fiber 110B. Specifically, the laser driver 103 receives the electrical signal as represented by the arrow 103A, and drives the transmitter 104 (e.g., a laser or Light Emitting Diode (LED)) with signals that cause the transmitter 104 to emit onto the fiber 110B optical signals representative of the information in the electrical signal provided by the host 111. Accordingly, the transmitter 104 serves as an electro-optic transducer.

The behavior of the receiver 101, the post-amplifier 102, the laser driver 103, and the transmitter 104 may vary dynamically due to a number of factors. For example, temperature changes, power fluctuations, and feedback conditions may each affect the performance of these components. Accordingly, the optical transceiver 100 includes a control module 105, which may evaluate temperature and voltage conditions and other operational circumstances, and receive information from the post-amplifier 102 (as represented by arrow 105A) and from the laser driver 103 (as represented by arrow 105B). This allows the control module 105 to optimize the dynamically varying performance, and additionally detect when there is a loss of signal.

Specifically, the control module 105 may counteract these changes by adjusting settings on the post-amplifier 102 and/ or the laser driver 103 as also represented by the arrows 105A and 105B. These settings adjustments are quite intermittent since they are only made when temperature or voltage or other low frequency changes so warrant. Receive power is an example of such a low frequency change.

The control module 105 may have access to a persistent memory 106, which in one embodiment, is an Electrically Erasable and Programmable Read Only Memory (EE-PROM). The persistent memory 106 and the control module 105 may be packaged together in the same package or in different packages without restriction. Persistent memory 106 may also be any other non-volatile memory source.

Figure 2:
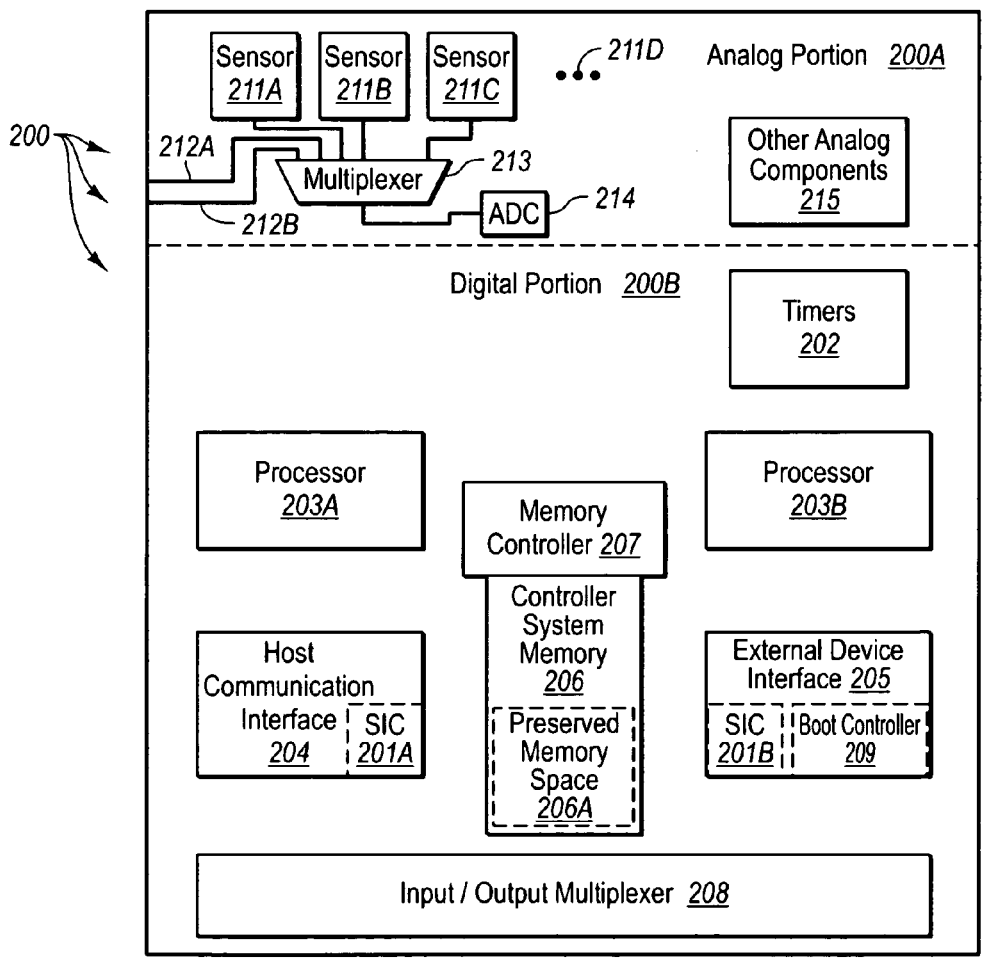
FIG. 2 schematically illustrates an example of a control module of FIG. 1.

The control module 105 includes both an analog portion 108 and a digital portion 109. Together, they allow the control module to implement logic digitally, while still largely interfacing with the rest of the optical transceiver 100 using analog signals. FIG. 2 schematically illustrates an example 200 of the control module 105 in further detail. The control module 200 includes an analog portion 200A that represents an example of the analog portion 108 of FIG. 1, and a digital portion 200B that represents an example of the digital portion 109 of FIG. 1.

For example, the analog portion 200A may contain digital to analog converters, analog to digital converters, high speed comparators (e.g., for event detection), voltage based reset generators, voltage regulators, voltage references, clock generator, and other analog components. For example, the analog portion 200A includes sensors 211A, 211B, 211C amongst potentially others as represented by the horizontal ellipses 211D. Each of these sensors may be responsible for measuring operational parameters that may be measured from the control module 200 such as, for example, supply voltage and transceiver temperature. The control module may also receive external analog or digital signals from other components within the optical transceiver that indicate other measured parameters such as, for example, laser bias current, transmit power, receive power, laser wavelength, laser temperature, and Thermo Electric Cooler (TEC) current. Two external lines 212A and 212B are illustrated for receiving such external analog signals although there may be many of such lines.

The internal sensors may generate analog signals that represent the measured values. In addition, the externally provided signals may also be analog signals. In this case, the analog signals are converted to digital signals so as to be available to the digital portion 200B of the control module 200 for further processing. Of course, each analog parameter value may have its own Analog to Digital Converter (ADC). However, to preserve chip space, each signal may be periodically sampled in a round robin fashion using a single ADC such as the illustrated ADC 214. In this case, each analog value may be provided to a multiplexer 213, which selects in a round robin fashion, one of the analog signals at a time for sampling by the ADC 214. Alternatively, multiplexer 213 may be programmed to allow any order of analog signals to be sampled by ADC 214.

As previously mentioned, the analog portion 200A of the control module 200 may also include other analog components 215 such as, for example, digital to analog converters, other analog to digital converters, high speed comparators (e.g., for event detection), voltage based reset generators, voltage regulators, voltage references, clock generator, and other analog components.

The digital portion 200B of the control module 200 may include a timer module 202 that provides various timing signals used by the digital portion 200B. Such timing signals may include, for example, programmable processor clock signals. The timer module 202 may also act as a watchdog timer.

Two general-purpose processors 203A and 203B are also included. The processors recognize instructions that follow a particular instruction set, and may perform normal general-purpose operation such as shifting, branching, adding, subtracting, multiplying, dividing, Boolean operations, comparison operations, and the like. In one embodiment, the general-purpose processors 203A and 203B are each a 16-bit processor and may be identically structured. The precise structure of the instruction set is not important to the principles of the present invention as the instruction set may be optimized around a particular hardware environment, and as the precise hardware environment is not important to the principles of the present invention.

A host communications interface 204 is used to communicate with the host 111, possibly implemented using a two-wire interface such as I²C shown in FIG. 1 as the serial data (SDA) and serial clock (SCL) lines on the optical transceiver 100. Other host communication interfaces may also be implemented as well. Data may be provided from the control module 105 to the host 111 using this host communications interface to allow for digital diagnostics and readings of temperature levels, transmit/receiver power levels, and the like. The external device interface 205 is used to communicate with, for example, other modules within the optical transceiver 100 such as, for example, the post-amplifier 102, the laser driver 103, or the persistent memory 106.

The internal controller system memory 206 (not to be confused with the external persistent memory 106) may be Random Access Memory (RAM) or non-volatile memory. The memory controller 207 shares access to the controller system memory 206 amongst each of the processors 203A and 203B and with the host communication interface 204 and the external device interface 205. In one embodiment, the host communication interface 204 includes a serial interface controller 201A, and the external device interface 205 includes a serial interface controller 201B. The two serial interface controllers 201A and 201B may communicate using a two-wire interface such as I²C or another interface so long as the interface is recognized by both communicating modules. One serial interface controller (e.g., serial interface controller 201B) is a master component, while the other serial interface controller (e.g., serial interface controller 201A) is a slave component.

An input/output multiplexer 208 multiplexes the various input/output pins of the control module 200 to the various components within the control module 200. This enables different components to dynamically assign pins in accordance with the then-existing operational circumstances of the control module 200. Accordingly, there may be more input/output nodes within the control module 200 than there are pins available on the control module 200, thereby reducing the footprint of the control module 200.

Having described a specific environment with respect to FIGS. 1 and 2, it will be understood that this specific environment is only one of countless architectures in which the principles of the present invention may be employed. As previously stated, the principles of the present invention are not intended to be limited to any particular environment. Accordingly, the principles of the present invention relate to an optical transceiver that may be configured to preserve a portion of volatile memory during a warm reboot process. The principles of the present invention will be discussed with reference to the environment described in relation to FIGS. 1 and 2.

As discussed previously, transceiver 100 contains a controller system memory 206. Controller system memory 206 may contain a preserved memory space 206A that is configured to not have microcode written to it during a warm reboot process. Instead, the preserved memory space 206A is used for writing data that may be desirable for transceiver 100 to access after the warm reboot process. This data may include error data (e.g., logged operational faults) written by the processors 203 prior to a warm reboot or a run time counter that tracks how long transceiver 100 has run. As such, the preserved memory space 206A is preserved during a warm reboot process.

Referring to FIG. 2, external device interface 205 is shown. In addition to the functionality discussed previously, external device interface 205 may also include a boot controller 209. Boot controller 209 may be configured to control persistent memory 106 during a warm reboot process. Boot controller 209 may be further configured to control the amount of microcode that is loaded from persistent memory 106 to controller system memory 206.

Figure 3:
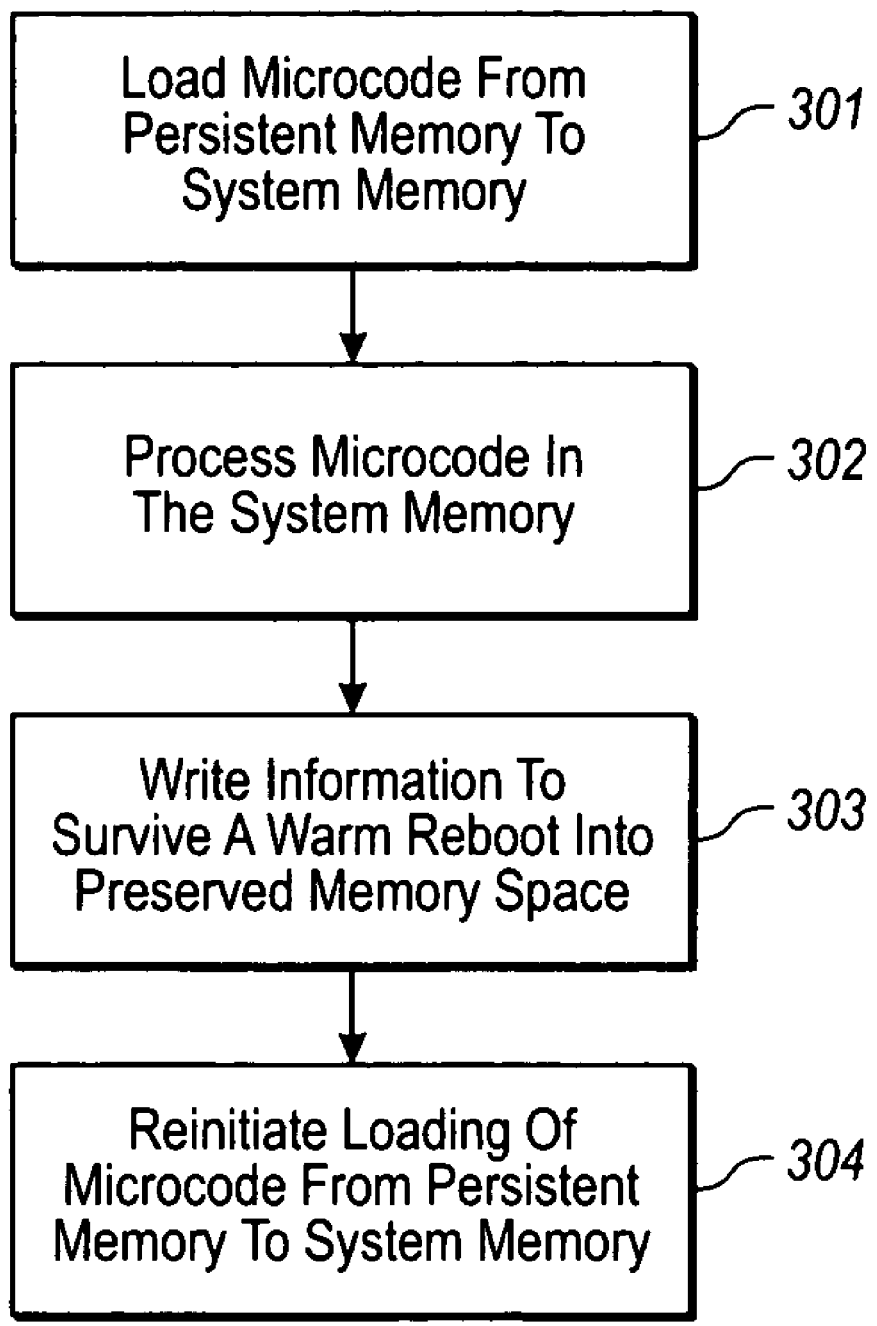
FIG. 3 illustrates a method for preserving a portion of volatile memory in an optical transceiver during a warm reboot.

Referring to FIG. 3, a flowchart of a method 300 for an optical transceiver to preserve a portion of volatile memory during a warm reboot is illustrated. First, microcode is loaded from a persistent memory to a system memory during a warm reboot process without writing any microcode into a preserved memory space of the system memory (act 301). The persistent memory source may be any non-volatile memory including, but not limited to, an on transceiver persistent memory such as persistent memory 106 of FIG. 2, a host computing system memory such as host memory 112 of FIG. 1, or some remote persistent memory that is connected to the optical transceiver through use of a network such as the internet. The system memory may be any volatile memory such as RAM or a flip-flop that may be configured to include a preserved memory space and may be represented by controller system memory 206 of FIG. 2.

Referring to FIG. 2, the boot controller 209 may initiate a warm reboot process. In the description and in the claims, "warm reboot" is defined as a boot process that occurs after the transceiver has been in operation for a period of time. Boot controller 209 may begin loading microcode or other data from persistent memory 106 into controller system memory 206. However, microcode from persistent memory 106 will not be written to the preserved memory space 206A of controller system memory 206 as discussed previously.

In another embodiment, processors 203 may be configured to initiate and control the warm reboot process of transceiver 100. Processors 203 may load microcode from persistent memory 106 into controller system memory 206, excepting the preserved memory space 206A, in the manner described.

Referring again to the method illustrated in FIG. 3, an optical transceiver processor processes the microcode loaded into the system memory (act 302). During the act of processing, the processor may write information that is desirable to have survive a warm reboot into the preserved memory space (act 303). For example, while processing the microcode, the processor may detect an operational error in the optical transceiver. This may cause the processor to write information regarding the operational error in the preserved memory space. This information will not be overwritten during a warm reboot process as will be described.

In the embodiment illustrated with respect to FIGS. 1 and 2, processors 203 may execute the microcode in controller system memory 206. The executed microcode may initialize transceiver 100 hardware. During execution, processors 203 may detect an error in the operation of transceiver 100. The processors 203 may write information concerning the error, such as a run time counter, to the preserved memory space 206A in controller system memory 206.

Finally, again referring to the method of FIG. 3, a warm reboot process is begun by reinitiating the loading of microcode from the persistent memory to the system memory (act 304). The warm reboot process may be initiated by the optical transceiver or it may be initiated by a host computing system coupled to the optical transceiver. During the warm reboot, any information that was previously written to the preserved memory space is not overwritten and may later be available for error analysis.

For example, either boot controller 209 or the processors 203 of FIG. 2 may initiate a warm reboot process if circumstances warrant, such as an operational error is detected. Processors 203 may direct boot controller 209 to initiate a warm reboot process. Alternatively, the processors 203 may initiate the warm reboot without the use of boot controller 209. In addition, boot controller 209 may initiate a warm reboot upon detecting an error in optical transceiver 100's hardware.

Additionally, a user may desire to cause that a warm reboot occur by directing optical transceiver 100 to initiate a warm reboot through use of host 111. The user may, prior to the warm reboot, direct that the processors 203 write information to the preserved memory space 206A that may be useful to the user after the warm reboot process.

On initiation of the warm reboot, boot controller 209 or processors 203 may reinitiate the loading of microcode from the persistent memory 106 into controller system memory 206. As the new microcode is loaded into controller system memory 206, microcode and other data already stored in controller system memory 206 prior to the warm reboot is overwritten. Boot controller 209 may, however, be configured to direct that a portion of the microcode in persistent memory 106 not be loaded. The portion of microcode that is not loaded may be a similar size to the preserved memory space 206A. However, the portion not loaded may be a size other than the preserved memory space 206A.

As mentioned previously, data written in the preserved memory space 206A is not overwritten by new microcode and is thus preserved. On completion of the warm reboot process, transceiver 100 may be able to access the data written in the preserved memory space 206A and use it for further transceiver 100 purposes. For example, if the processors 203 had written error data prior to the warm reboot, then processors 203 may analyze the data to ascertain the error. Alternatively, the processors 203 may access a saved run time counter to ascertain where in the warm reboot process the error may have occurred. In some embodiments, host 111 may also access preserved memory space 206A and analyze the data stored there to ascertain any errors in the operation of transceiver 100.

Accordingly, the principles of the present invention relate to an optical transceiver configured to preserve a portion of volatile memory during a warm reboot process. Transceiver processors write data that is needed after the warm reboot to a preserved portion of the system memory. The preserved portion of system memory does not have new microcode written to it during the warm reboot. In this way, vital information is not overwritten by new microcode and is available for the transceiver to use. Accordingly, the principles of the present invention represent a significant advancement in the art of optical transceivers.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In an optical transceiver including a control module, a persistent memory that is external to the control module, a processor, an external device interface, and a system memory that are included within the control module, wherein the external device interface is configured to communicate with one or more modules of the optical transceiver that are not included within the control module and wherein the external device interface includes a boot controller, a method for the optical transceiver to preserve a portion of the system memory during a warm reboot process, the method comprising:
    an act of the boot controller loading microcode from the persistent memory to the system memory via the external interface without writing into a preserved memory space of the system memory during the act of loading;
    an act of the processor processing the microcode in the system memory; and
    during the act of processing, an act of writing information to survive a warm reboot into the preserved memory space of the system memory.

2. A method in accordance with claim 1, further comprising:
    an act of the boot controller reinitiating the act of loading, wherein the information written to the preserved memory space during the act of writing is not written over during the act of reinitiating the act of loading since the written information is within the preserved memory space of the system memory.

3. in accordance with claim 1, wherein the information to survive a warm reboot is a run time counter.

4. A method in accordance with claim 1, wherein the information to survive a warm reboot is optical transceiver error data.

5. A method in accordance with claim 1, wherein a portion of microcode that is the same size as the preserved memory space is not loaded from the persistent memory to the system memory during the act of reinitiating the act of loading.

6. A method in accordance with claim 1, wherein the information written to the preserved memory space is analyzed by the optical transceiver.

7. A method in accordance with claim 1, wherein the information written to the preserved memory space is analyzed by a host computing system that is coupled to the optical transceiver.

8. A method in accordance with claim 1, wherein control module includes both an analog portion and a digital portion.

9. A method in accordance with claim 1, wherein the warm reboot process is initiated by the boot controller.

10. A method in accordance with claim 1, wherein the warm reboot process is initiated a host computing system that is coupled to the optical transceiver.

11. A method in accordance with claim 1, wherein the optical transceiver is one of a 1G laser transceiver, a 2G laser transceiver, a 4G laser transceiver, a 8G laser transceiver, or a 10G laser transceiver.

12. A method in accordance with claim 1, wherein the optical transceiver is a laser transceiver suitable for fiber optic links greater than 10G.

13. A method in accordance with claim 1, wherein the optical transceiver is one of a XFP laser transceiver, a SFP laser transceiver, or a SFF laser transceiver.

14. An optical transceiver comprising:
    a control module;
    a persistent memory that is external to the control module;
    a system memory including a preserved memory space that is configured to survive a warm reboot;
    a processor;
    an external device interface is configured to communicate with one or more modules of the optical transceiver that are not included within the control module, wherein the system memory, the processor, and the external device interface are included within the control module; and a boot controller implemented as part of the external device interface;

wherein the boot controller is configured to:

load microcode from the persistent memory to the system memory via the external interface without writing into the preserved memory space while loading microcode; and wherein the processor is configured to:

process the microcode in the system memory; and while processing the microcode, write information to survive a warm reboot into the preserved memory space.

15. An optical transceiver in accordance with claim 14, wherein the information written to the preserved memory space is not written over during re-initiation of the loading of microcode from the persistent memory to the system memory since the written information is within the preserved memory space of the system memory.

16. An optical transceiver in accordance with claim 14, wherein the information to survive a warm reboot is a run time counter.

17. An optical transceiver in accordance with claim 14, wherein the information to survive a warm reboot is optical transceiver error data.

18. An optical transceiver in accordance with claim 14, wherein the optical transceiver is one of a 1G laser transceiver, a 2G laser transceiver, a 4G laser transceiver, a 8G laser transceiver, or a 10G laser transceiver.

19. An optical transceiver in accordance with claim 14, wherein the optical transceiver is a laser transceiver suitable for fiber optic links greater than 10G.

20. An optical transceiver in accordance with claim 14, wherein the optical transceiver is one of a XFP laser transceiver, a SFP laser transceiver.

* * * * *

UNITED STATES PATENT AND TRADEMARK OFFICE
CERTIFICATE OF CORRECTION

PATENT NO. : 7,533,254 B2
APPLICATION NO. : 11/228544
DATED : May 12, 2009
INVENTOR(S) : Dybsetter et al.

It is certified that error appears in the above-identified patent and that said Letters Patent is hereby corrected as shown below:

Column 1
Line 18, move "2. The Relevant Technology" down to line 19.

Column 8
Line 26, change "in accordance" to --A method in accordance--.
Line 47, change "initiated" to --initiated by--.

Signed and Sealed this

Ninth Day of March, 2010

David J. Kappos
*Director of the United States Patent and Trademark Office*